United States Patent Office.

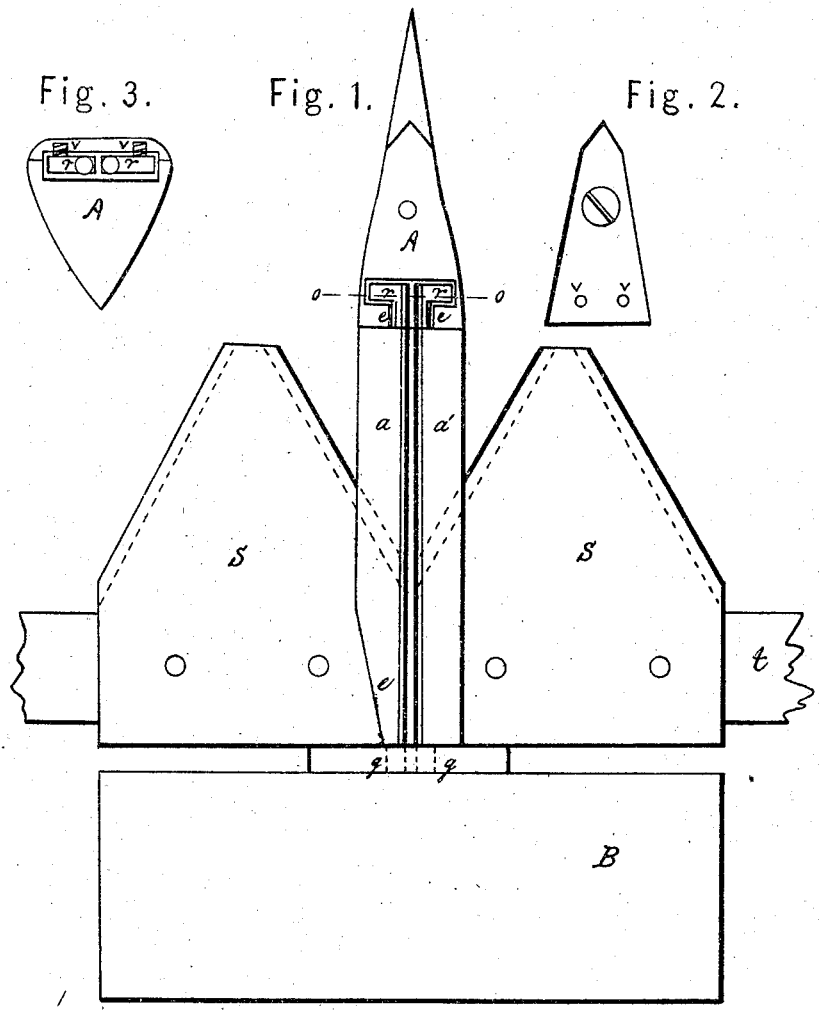

WILLIAM G. KENYON, OF WAKEFIELD, RHODE ISLAND.

Letters Patent No. 113,175, dated March 28, 1871.

IMPROVEMENT IN HARVESTER-CUTTERS.

The Schedule referred to in these Letters Patent and making part of the same.

*To all whom it may concern:*

Be it known that I, WILLIAM G. KENYON, of Wakefield, in the county of Washington and State of Rhode Island, have invented certain new and useful Improvements in the Cutting Apparatus of Mowing-Machines and Harvesters; and do hereby declare the following to be a full and correct description thereof, reference being had to the accompanying drawing making part of this specification and to the letters and numbers of reference marked thereon, similar letters and numbers being used in all the figures to denote the same parts.

This invention consists in a combination and arrangement of the ledges, blades, and knives of a harvester or mowing-machine with the guard-fingers thereof, in such a manner that they shall be much less liable to clog up with grass or dirt, with increased facilities for removing the ledger-blades when necessary; and this is accomplished mainly by placing the ledger-blades over the knives and extending them back beyond the knife-bar.

Description of the Drawing.

Figure 1 is a top view of the guard-finger, with the knife-bar and ledger-blades in place and the finger-cap removed.

Figure 2 shows the finger-cap separate.

Figure 3 is a cross-section of the guard-finger taken at line *o o* in fig. 1.

Figure 4 shows the ledger-blades apart.

General Description.

A is the guard-finger attached to B, a part of the finger-bar.

*s s* are the knives, fastened to the bar *t*, and lying underneath the two ledger-blades *a a'*, which extend back across the knives to bearings in the back part of the guard-finger.

The front ends of the ledger-blades are held in bearings in the head of the finger at *e e*.

The front ends of the ledger-blades beyond their bearings are formed into wings or projections on the sides from the center, and small springs, *v v*, are put in recesses in the finger-cap, (see fig. 2,) which press upon the wings *r r* of the ledger-blades and turn their outer edges down against the knives *s s*, thus insuring a shear cut at the crossing or junction of the ledger-blades and the knives below, which have their edges on the upper side.

A recess is made in the head of the finger under the cap to receive the wings or projections on the end of the ledger-blades.

A plain open passage is made between the knives and the finger underneath where the cutting is done, which is kept clear and free from clogging by the passing of the knives through it.

The back ends of ledger-blades, as above stated, are held in bearings *g g* in a raised portion of the guard-finger, between the knife or cutter-bar and the finger-bar.

The back ends of ledger-blades may be beveled away, as shown at *a l*, when knives with straight joints are used, and left straight, like *a'*, when the knives are joined diagonally.

What I claim as my invention, and desire to secure by Letters Patent, is—

The combination and arrangement of the two ledger-blades *a a'*, guard-finger A, and knives *s s*, the ledger-blades extending over the knives to bearings in the guard-finger back of the knife-bar, the whole being constructed substantially as and for the purpose specified.

WM. G. KENYON.

Witnesses:
JAS. E. ARNOLD,
BENJAMIN ARNOLD.